United States Patent

Kare

Patent Number: 5,973,634
Date of Patent: Oct. 26, 1999

[54] METHOD AND APPARATUS FOR REDUCING RANGE AMBIGUITY IN SYNTHETIC APERTURE RADAR

[75] Inventor: Jordin T. Kare, San Ramon, Calif.

[73] Assignee: The Regents of the University of California, Oakland, Calif.

[21] Appl. No.: 08/988,604

[22] Filed: Dec. 10, 1997

Related U.S. Application Data

[60] Provisional application No. 60/033,292, Dec. 10, 1996.

[51] Int. Cl.[6] .................................................... G01S 13/90
[52] U.S. Cl. ............................................ 342/25; 342/159
[58] Field of Search ............................. 342/25, 102, 159, 342/162

[56] References Cited

U.S. PATENT DOCUMENTS

| | | | |
|---|---|---|---|
| H1005 | 12/1991 | Gerlach | 342/378 |
| 3,835,469 | 9/1974 | Chen et al. | 343/854 X |
| 4,489,325 | 12/1984 | Bauck et al. | 342/374 |
| 4,566,013 | 1/1986 | Steinberg et al. | 342/372 |
| 5,003,314 | 3/1991 | Berkowitz et al. | 342/372 |
| 5,027,125 | 6/1991 | Tang | 342/368 |
| 5,283,587 | 2/1994 | Hirshfield et al. | 342/372 |
| 5,294,933 | 3/1994 | Lee et al. | 342/159 |
| 5,537,367 | 7/1996 | Lockwood et al. | 367/87 |

Primary Examiner—John B. Sotomayor
Attorney, Agent, or Firm—L. E. Carnahan

[57] ABSTRACT

A modified Synthetic Aperture Radar (SAR) system with reduced sensitivity to range ambiguities, and which uses secondary receiver channels to detect the range ambiguous signals and subtract them from the signal received by the main channel. Both desired and range ambiguous signals are detected by a main receiver and by one or more identical secondary receivers. All receivers are connected to a common antenna with two or more feed systems offset in elevation (e.g., a reflector antenna with multiple feed horns or a phased array with multiple phase shift networks. The secondary receiver output(s) is (are) then subtracted from the main receiver output in such a way as to cancel the ambiguous signals while only slightly attenuating the desired signal and slightly increasing the noise in the main channel, and thus does not significantly affect the desired signal. This subtraction may be done in real time, or the outputs of the receivers may be recorded separately and combined during signal processing.

20 Claims, 6 Drawing Sheets

METHOD AND APPARATUS FOR REDUCING RANGE AMBIGUITY IN SYNTHETIC APERTURE RADAR

RELATED APPLICATION

This application relates to U.S. Provisional Application No. 60/033,292 filed Dec. 10, 1996, and claims priority thereof The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to radar and sonar systems, particularly to reducing range ambiguity in radar and sonar systems, and more particularly to a method and apparatus for reducing range ambiguity in a side-looking or synthetic aperture radar by the use of a main receiver and one or more secondary receivers and subtracting the secondary receiver outputs from the main receiver output so as to cancel the ambiguous signals.

Over the years various radar systems have been developed for different applications. One such radar system now under development at the Lawrence Livermore National Laboratory (LLNL) is the satellite-based Synthetic Aperture Radar (SAR) system being developed for military, strategic, or earth/environmental resources applications. The LLNL SAR system is being designed to have the capability of meeting specified parameters over a wide target area. One of the design constraints on the LLNL-SAR and other SAR systems is the need to keep range ambiguous signals below a specified level. The main source of range-ambiguous signals is the reflection of pulses preceding and following the pulse of interest; i.e., signals from pulses N±1 when pulse N is being reflected from the desired range R.

Normally, range-ambiguous signals are rejected primarily by the response of the SAR antenna(s) as a function of elevation angle. Because the SAR beam is not parallel to the ground, but intersects it at some angle (the grazing angle), different ranges correspond to different elevations as seen by the SAR. The SAR antenna gain is maximum at the center of the target area, and decreases at greater or lesser elevations (and at longer and shorter ranges). Thus, the range ambiguous signal is attenuated both on transmission and reception. Typically, this attenuation is −10 dB or more in each direction. However, to provide this level of attenuation, the interval between pulses must be significantly (typically 2×) longer than the theoretical minimum interval set by (2× width of the target 1C, where C is the speed of light); i.e., pulse N−1 must be well beyond the "far" edge of the target when pulse N reaches the "near" edge of the target.

This problem is exacerbated if the transmitted beam is much broader than the beam defined by the receive antenna. In this case, ambiguous signal are attenuated primarily by the falloff of the receiver antenna gain, and not by the transmit antenna pattern. Thus, there is a need for a way to effectively reduce range ambiguity without significantly affecting the desired signal.

The present invention is directed to the solution of the above mentioned need, and provides a modified Synthetic Aperture Radar system with reduced sensitivity to range ambiguities. The invention uses secondary receiver channels to detect the range-ambiguous signals and subtract them from the signal received by the main channel without significantly affecting the desired signal. Both desired and range-ambiguous signals are detected by a main receiver and by one or more identical secondary receivers, all connected to a common antenna with two or more feed systems offset in elevation. The subtraction of signals may be done in real time, or the outputs of the receivers may be recorded separately and combined during signal processing. Thus, the present invention relates to radar and sonar systems, particularly to reducing range ambiguity in radar and sonar systems, and more particularly to a method and apparatus for reducing range ambiguity in radar or sonar systems in which the intended target is viewed obliquely, as in side-looking or synthetic aperture radar systems.

SUMMARY OF THE INVENTION

It is an object of the present invention to reduce range ambiguity in a radar or sonar system.

A further object of the invention is to provide a method and apparatus for reducing range ambiguity in a Synthetic Aperture Radar (SAR).

A further object of the invention is to provide a modified SAR system with reduced sensitivity to range ambiguities.

A further object of the invention is to provide a method and apparatus for reducing range ambiguity in radar and sonar systems in which the intended target is viewed obliquely.

Another object of the invention is to provide an SAR system which uses secondary receiver channels to detect the range-ambiguous signals and subtract them from the signal received by the main channel.

Another object of the invention is to provide an SAR system using main and secondary receivers connected to a common antenna via parallel feed systems, so that all phase and timing relationships are identical for all channels, but with the feed system for the secondary receivers yielding an antenna gain pattern offset in elevation from the gain pattern for the main channel, such that ambiguous signals from greater or lesser range are detected with maximum gain while the main signal is attenuated in these channels.

Another object of the invention is to provide a method for reducing range ambiguity in a SAR by scaling and subtracting secondary-channel signals from the main-channel signal, whereby the range ambiguous signal component can be canceled out, leaving only the desired signal.

Another object of the invention is to provide a method for reducing ambiguity in a SAR system by scaling and subtracting a secondary-channel signal from a main-channel signal using scaling and subtraction in real time or during image processing.

Another object of the invention is to provide an SAR system using main and secondary channels, so that the main-channel signal is canceled out and the ambiguous secondary-channel signal remains.

Another object of the invention is to reduce range ambiguity in a multiple-beam SAR system, in which each of several receiver channels acts simultaneously as the main channel for receiving signals from one pulse, and as a secondary channel for canceling out ambiguous signals detected by the other receivers.

Other objects and advantages of the present invention will become apparent from the following description and accompanying drawings. The invention is directed to a method and apparatus for reducing range ambiguity in sonar or radar systems such as a Synthetic Aperture Radar (SAR) system.

An SAR system is modified in accordance with the present invention wherein both desired and range-ambiguous signals are detected by a main receiver and by one or more identical secondary receivers, with all receivers connected to a common antenna with two or more feed systems offset in elevation. The secondary receiver outputs(s) is (are) then subtracted from the main receiver output in such a way as to cancel the ambiguous signals without significantly affecting the desired signal. This subtraction may be done in real time, or the outputs of the receivers may be recorded separately and combined during signal processing.

BRIEF DESCRIPTION OF THE DRAWINGS

The accompanying drawings, which are incorporated into and from a part of the disclosure, illustrate embodiments of the invention and, together with the description, serve to explain the principles of the invention.

DETAILED DESCRIPTION OF THE INVENTION

The present invention involves reducing range ambiguity in radar or sonar systems in which the intended target is viewed obliquely, such as in side-looking or Synthetic Aperture Radar (SAR) systems, and provides a modified SAR system using a main receiver and one or more identical secondary receivers. All the receivers are connected to a common antenna with two or more feed systems offset in elevation (e.g., a reflector antenna with multiple feed horns or a phased array with multiple phase shift networks). Both the desired and range-ambiguous signal are detected by the main receiver and by the one or more identical secondary receivers. The secondary receiver output(s) is (are) then subtracted from the main receiver output in such a way as to cancel the ambiguous signals without significantly affecting the desired signal. The subtraction process necessarily also slightly attenuates the desired signal, and slightly increases the noise in the main channel, but both effects can be made small. The amplitude and phase of the scaling factor varies over the duration of an interpulse time, as the apparent positions of the main and ambiguous pulses on the ground move across their respective receive antenna patterns. Thus, although it is possible to do the scaling and subtraction in real time (i.e., directly combine the receiver outputs in analog or digital form) it is simpler to record both signals and perform the scaling and subtraction during digital image processing.

It is also possible, using the method and apparatus of the present invention, to reverse the roles of the main and secondary channels, so that the "main" signal is canceled out and the "ambiguous" signal remains. The present invention may be utilized in the above-referenced LLNL SAR, which uses several receivers and antenna feeds to cover a wider target swath than can be covered by a single receiver beam; this is a so-called "multiple elevation beam" SAR. Thus, the present invention can be used to improve the performance of future SAR systems used for military, strategic, or earth/environmental resources applications, as well as to improve the performance of future SAR systems used for commercial imaging, including news gathering and resource exploration/management. Also, it is possible to retrofit existing systems with the receiver arrangement of the present invention.

Figure 1A:
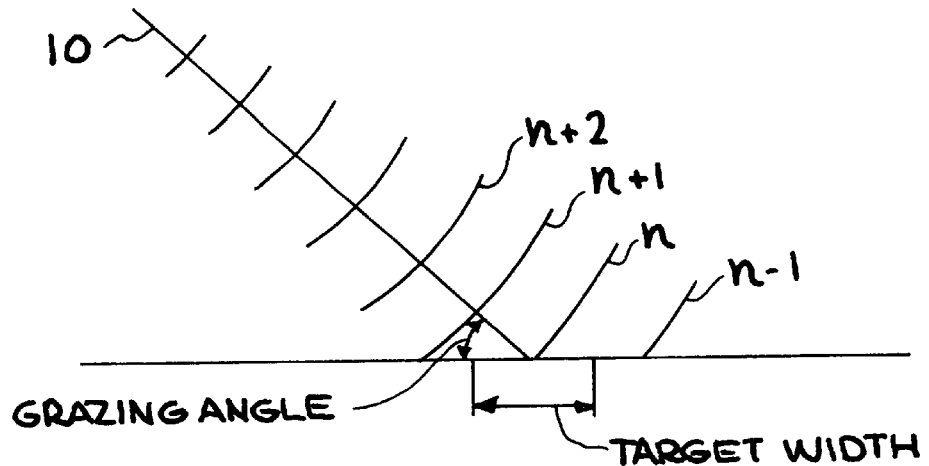
FIGS. 1A and 1B illustrate the respective transmit and receive geometry associated with a SAR or other radar or sonar system to which the present invention applies.
Figure 1B:
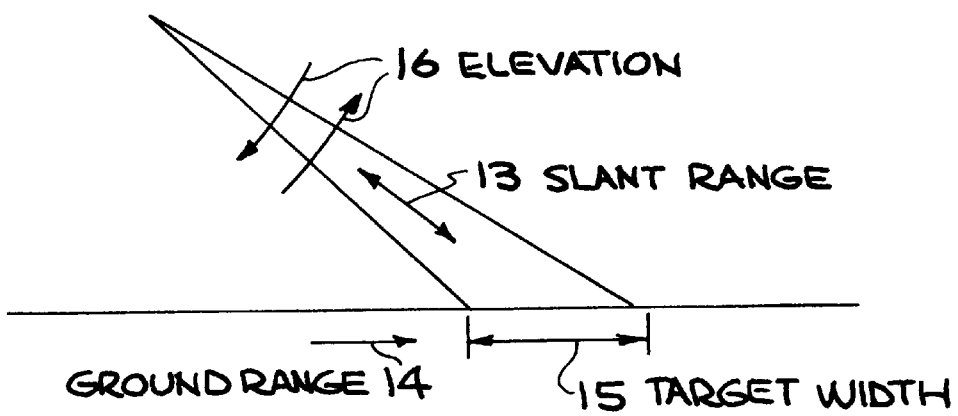
Figure 1C:
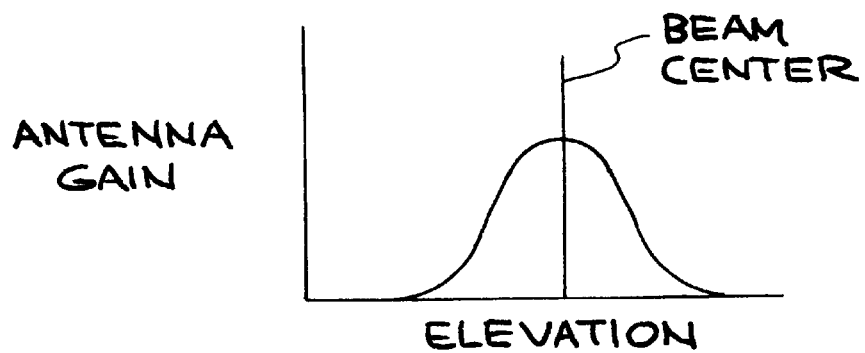
FIG. 1C graphically illustrates antenna gain vs. elevation.

The dominant contribution to range-ambiguous response in the above-referenced LLNL SAR concept comes from the adjacent pulses. When a receiver is receiving a return from pulse N, signals from pulses N−1 and N+1 (and possibly N±2, etc.) are also received with significant energy. In the limiting case of PRF=$PRF_{max}$, one of these signals may be attenuated by as little as 3 dB relative to the desired signal. FIG. 1A illustrates a transmit geometry showing the pulse numbers N−1, N, N+1, and N+2 with the beam 10 transmitting at a grazing angle 11, and having a target width as indicated by the arrow 12. FIG. 1B illustrates a receive geometry along a slant range indicated by arrow 13 to a ground range indicated by arrow 14, along a target width indicated by arrow 15. FIG. 1C illustrates the antenna gain at elevations indicated by arrows 16 in FIG. 1B, with the greatest gain being at the beam center.

Figure 2:
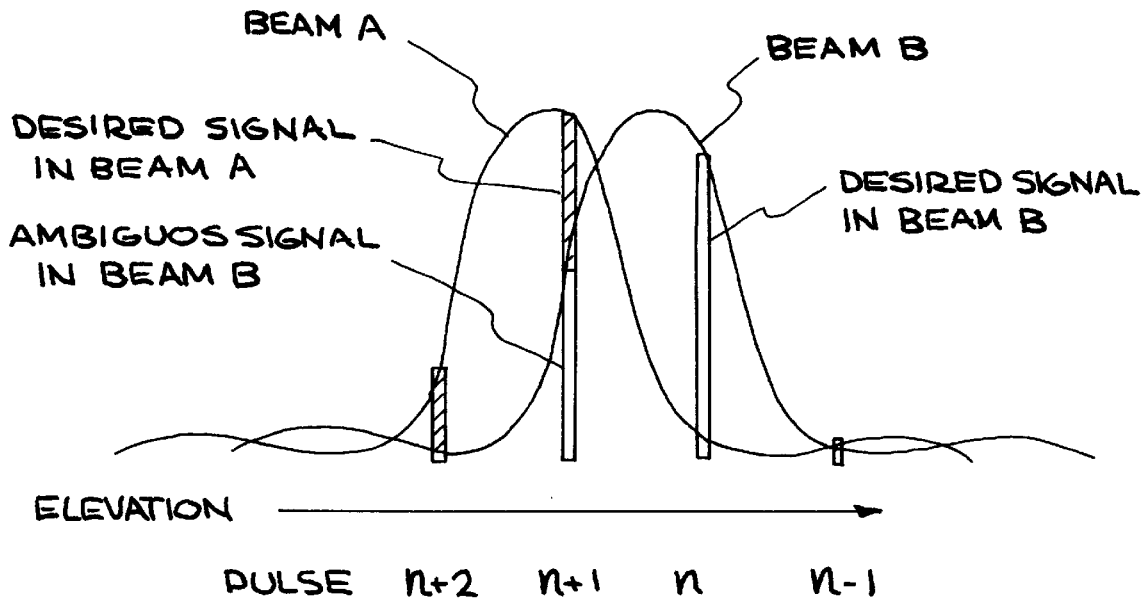
FIG. 2 illustrates the relationship of signal amplitudes and beam positions for a primary and secondary receiver as used in the present invention.

Consider a system with two receivers having overlapping responses, "watching" a series of transmitter pulses reflect from the ground. It is assumed that the PRF is slightly below the theoretical $PRF_{max}$, i.e., that the apparent spacing of the pulses in the ground plane is slightly more than the swath defined by one receive beam (typically, but not necessarily, defined by the −3 dB width of the beam). One than takes a snapshot at time t, when the ambiguous signal in beam B is maximum, as seen in FIG. 2.

Receiver B detects the signal from pule N with a gain of −3 dB; it also detects the signal from pulse N+1 with a gain <<−3 dB, perhaps −10 dB. However, receiver A also detects the signal from pulse N+1 near its maximum response, say a gain of −1 dB.

Receivers A and B are both picking up the signal from pulse N+1 at the same time, through the same path and antenna, but through different horns (for a fixed antenna) or phase-shift networks (for a phased array) which introduce the difference in gain, and perhaps also a phase difference. So if one takes the output of A, and multiply it by an appropriate gain (e.g., −9 dB) and phase factor, one can duplicate the output of B produced by pulse N+1. Provided the system is linear, one can subtract this reconstructed signal from the output of B, and recover the pure signal from pulse N.

More generally, suppose there are m receivers picking up the returns from n pulses (m>=n) at some instant in time t. Each return pulse may have a chirp or other structure, so it can be assumed each receiver's response to the reflected signal can be characterized by a gain G and phase Ø that are functions of both time (as each pulse moves across the receiver beam) and frequency. Then one gets m received signals:

$$R_m(f,t) = G, \phi_{m,n}(f,t) * S_n(f,t)$$

If one inverts the gain/phase matrix, one can compute the actual signals $S_n(f,t)$ from the received signals $R_m(f,t)$.

This matrix may not always be invertible, but for a reasonable system design in which the on-diagonal gains G(m, m) are significantly larger than the off-diagonal gains G(m,n=m) it will be readily invertible. This simply corresponds to ensuring that the desired signal in any beam is at least slightly stronger than the sum of the ambiguous signals—3 dB is probably sufficient.

An alternative way of looking at this process is that one combines two receive beams in such a way (correct gain and phase) as to create a null in the receive pattern at the elevation of the undesired ambiguous signal. With n beams, one can in principle create n−1 such nulls. By varying the amplitude and phase with which we combine the beams, one sweeps the null across the beam at the same rate the "illuminated spot" on the ground moves in elevation. The resulting beam has low response in the neighborhood of the null, but there's no desired signal coming from that neighborhood.

The gain/phase matrix as a function of time and frequency may be obtained in several ways:

1. Calculation based on the known geometry of the radar and target and the known receiver beam patterns and phase delay properties. The receiver beam patterns and phase delay properties may be measured once (at the initial calibration of the system) or, for greater precision, at intervals during system operation.

2. Measurement of relative gain and phase between receiver channels using one or more unambiguous pulses, similar to normal radar pulses but spaced sufficiently widely in time so that no significant ambiguous signals are present. In a SAR system, such pulses may be transmitted before and after collection of an image, or may be generated during an image collection time by skipping (not transmitting) a few pulses on either side of the unambiguous pulse; this will cause some degradation of the image, but the degradation will be small if the fraction of pulses skipped is small. In systems having a small fractional bandwidth, acceptable accuracy may be obtained by transmitting and measuring unambiguous pulses outside the frequency band in use of the radar, but sufficiently close in frequency to give similar antenna gain patterns; this can be done while the radar is in operation.

3. Extraction of relative gain and phase information from stored data during processing. For targets containing many distinct features such as point objects with large radar cross sections, simple correlation of signals from different receive channels can yield relative gain and phase information over a small number of pulses. For SAR systems, an iterative process may be employed, in which images reconstructed with different estimates of the relative receive channel gain and phase are compared, and the estimates adjusted to produce the best quality image.

Perfect suppression of ambiguous signals is possible in an ideal system of this type, but will be limited by several factors in a real system, such as identified hereinafter:

I. Receiver Noise:

Separate receive channels will have different noise signals, and combining received signals will add to the noise levels. However, the added noise will be essentially equal to the sum of the off-diagonal elements in a row of the inverse matrix—i.e., if $S_2$ is the desired signal and one has to add up $S_2-R_2+c_{21} R_1+c_{23} R_3$, then one will also have added the noises. The noises will add incoherently, so they will add as noise power: $N_{s2}=N_{R2}+c_{21} N_{R1}+c_{23}N_{R3}=N_R(1+c_{21}+c_{23})$ for identical receivers.

For these coefficients to be small, the ambiguous signals must not only be weak in the desired channel, but must be significantly stronger in another channel; e.g., a signal that is 10 dB down in both the desired channel A and some other channel B may be subtracted out, but at the expense of doubling the noise level. For the above-referenced LLNL system, however, one expects the increased noise level to be <1 dB; this requires that the dominant "cross-term" be <0.3, implying that the ambiguous signal is >5 dB down from the desired signal.

II. Azimuthal Variation:

The subtraction process depends on the relative gains and phases at a given time and frequency being expressible as single numbers. In a real system with finite azimuthal beam width, the gain of each receive channel is a function of azimuth as well as elevation. This has no effect if the azimuthal response is independent of elevation or has the same behavior in absolute elevation for all receive beams. It will make it impossible to exactly subtract out undesired responses if the azimuthal response varies with elevation relative to each beam center.

The level of suppression achievable would depend on the details of the azimuth variation, but even fairly large variations would allow useful suppression; e.g., if the integrated side lobe level in the azimuth direction is −10 dB, and there is a 3 dB difference in azimuth response outside the main lobe for two receive beams (and none within the main lobe), it would still be possible to get 13 dB of cancellation.

This is almost certainly not a problem for a phased array system oriented along the elevation and azimuth directions; the azimuth beam-forming effective aperture will be identical for all elevations and all beams. It is a potential problem for a reflector antenna, and care would need to be taken to design the feed system to maintain a uniform azimuth response.

III. Pulse Width:

For short transmitted pulses, the relative gain between channels is a function of time only. Real-time subtraction of signals is then feasible using only a controllable gain element in the subtraction circuit.

If the transmitted pulses have a duration which is significant compared to (target width*cos (grazing angle)), then the instantaneous returned signal from a given pulse will come from a range of elevations rather than from a single elevation. If the transmitted pulse varies in frequency with time in a simple fashion (e.g., a linear chirp) then the correct relative gain for signal subtraction will be a well-behaved function of frequency at any instant in time and accurate subtraction of ambiguous signals is still possible. However, real time skill require either a bank of filters and controllable gain elements or some other implementation of a filter with gain adjustable as a function of both frequency and time.

IV. Ground Height:

A larger error is associated with ground-height estimation errors, which cause an error in matching range to elevation, or sloping or uneven ground, which causes range and elevation to vary differently with azimuth. Accurate subtraction requires that a particular range (from which one is getting a reflection at some time t) be associated with a single elevation, since the receive beam gain is defined as a function of elevation. If multiple elevations are present at a single range, a subtraction which is correct for one elevation will be wrong for the others.

The magnitude of this effect depends on the slope of the receive beam profile, the grazing angle, and the degree of surface slope or roughness, but it can be estimated. Assume the receiver sensitivity varies by 1 dB/km in the elevation (slant plane normal) direction; at 30 degree grazing, that would correspond to about 0.5 dB/km in range). A 100 meter error in ground height would then produce a 0.1 dB error in receive beam gain, or about a 3% mis-estimate of the return signal. These errors are correctable given information about the scene height. A 100 meter "step" affecting half the beam would cause a 1.5% error, limiting the suppression of the signal to about 18 dB, and this error would not be correctable.

V. Gain and Phase Errors:

Obviously, there is some finite error in one's ability to determine the relative gains and phases of the different receive beams. As noted earlier, these can be calibrated at any time by sending out an unambiguous pulse or pulses (i.e., PRF<<$PRF_{max}$) and comparing the response of different receive channels. Assuming this can be done to 0.5% accuracy, it would limit suppression to −23 dB. This could even be done a few times per second during imaging, at the expense of a small (−30 dB) contribution to multiplicative noise. Note that the relative gains and phases are properties only of the antenna feed system and the receiver component variations, and should thus be fairly stable. Also note that, if the correction is done in processing, one need not know the calibration during recording of the image; the system can be calibrated after taking the image.

Figure 3:
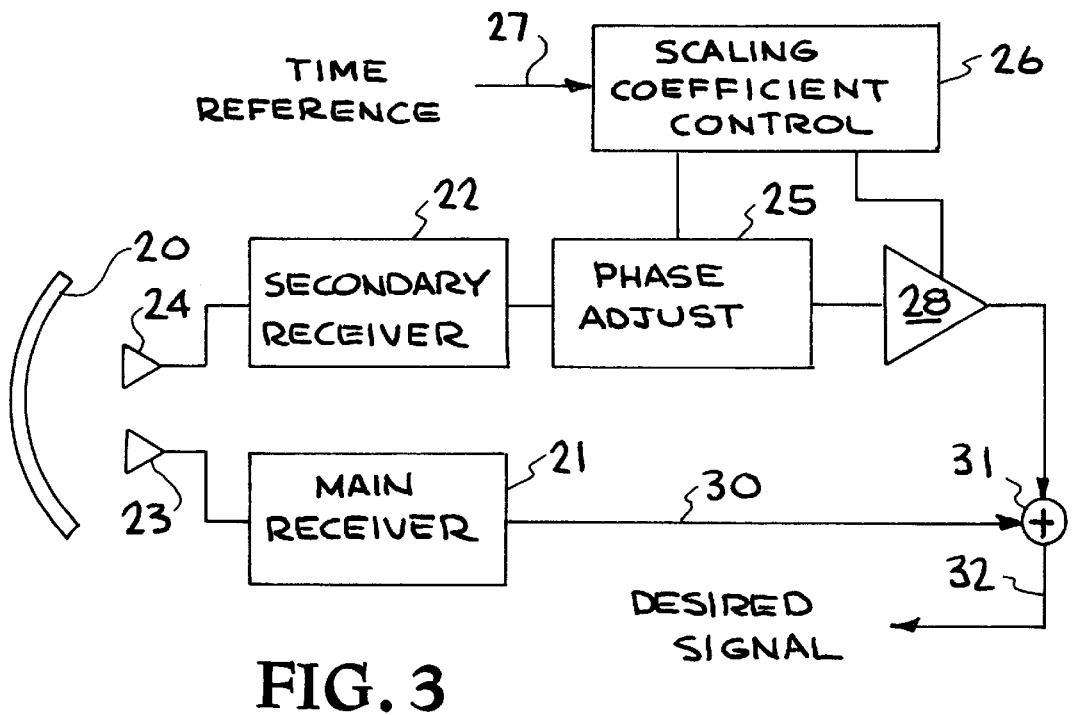
FIG. 3 illustrates schematically the baic components of the present invention as applied to a reflector antenna, and as implemented with real-time analog subtraction of signals.

FIG. 3 schematically illustrates the basic components of an embodiment made in accordance with the present invention as applied to a reflector antenna, and as implented with real-time analog subtraction of signals. The FIG. 3 embodiment comprises a reflector antenna 20, a main receiver 21, and a secondary receiver 22, main receiver 21 being connected to a main feed horn 23, while secondary receiver 22 is connected to a secondary feed horn 24, each of the receivers 21 and 22 receiving the same signal from reflector antenna 20. The signal from the secondary receiver 22 passes to a phase adjuster 25 which is connected to a scaling coefficient control 26 having a time reference as indicated by arrow 27 and to an amplifier 28 having an output signal 29 which is combined with a signal 30 from main receiver 21, as indicated at 31 to produce a desired signal as indicated by arrow 32.

Figure 4:
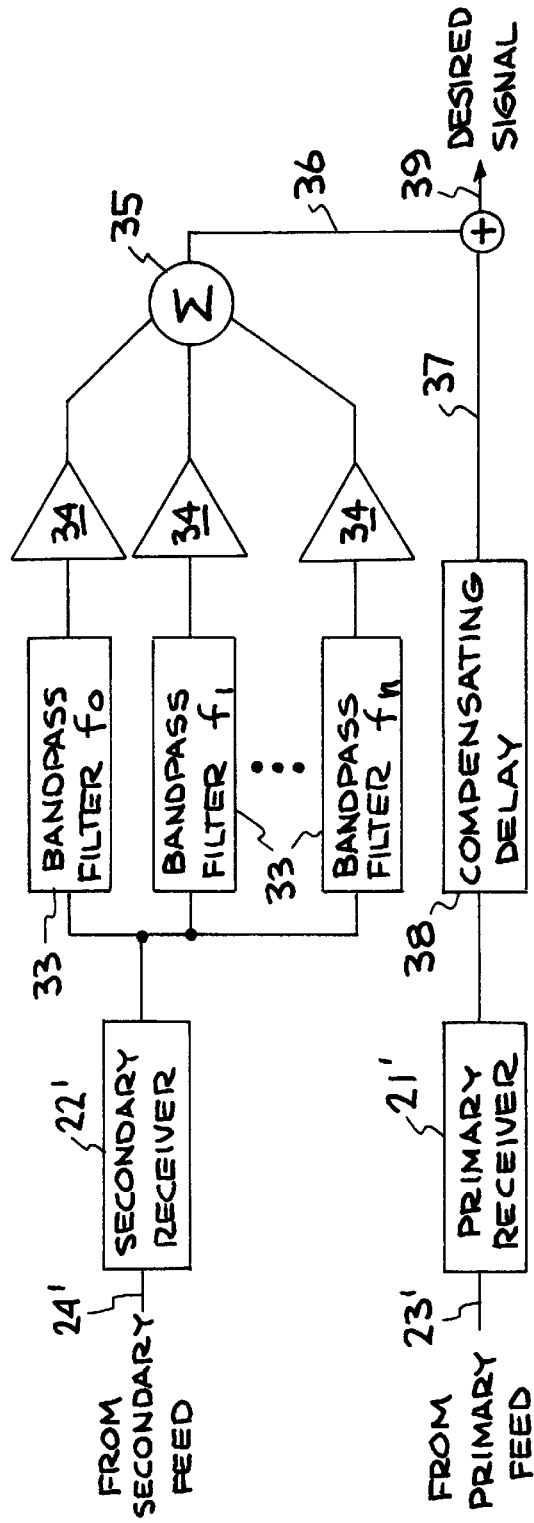
FIG. 4 illustrates schematically the basic components of the present invention in the case where the scaling coefficient is made frequency dependent by subdividing the received signal into multiple frequency bands.

FIG. 4 illustrates the basic components in a system where the scaling coefficient is made frequency dependent by subdividing the received signal into multiple frequency bands. Here, a main or primary receiver 21' and a secondary receiver 22' receive identical signals from a primary feed as indicated at 23' and a secondary feed as indicated at 24'. The signal from the secondary receiver 21' is subdivided by a number of bandpass filters 33 (three shown), the output of each filter passes to an amplifier 34 and to a summation device 35, with the output indicated at 36 being combined with a signal 37 from primary receiver 21' after passing through a compensating delay 38 (which compensates for phase delay in filters 33), to produce a desired signal 39.

Figure 5A:
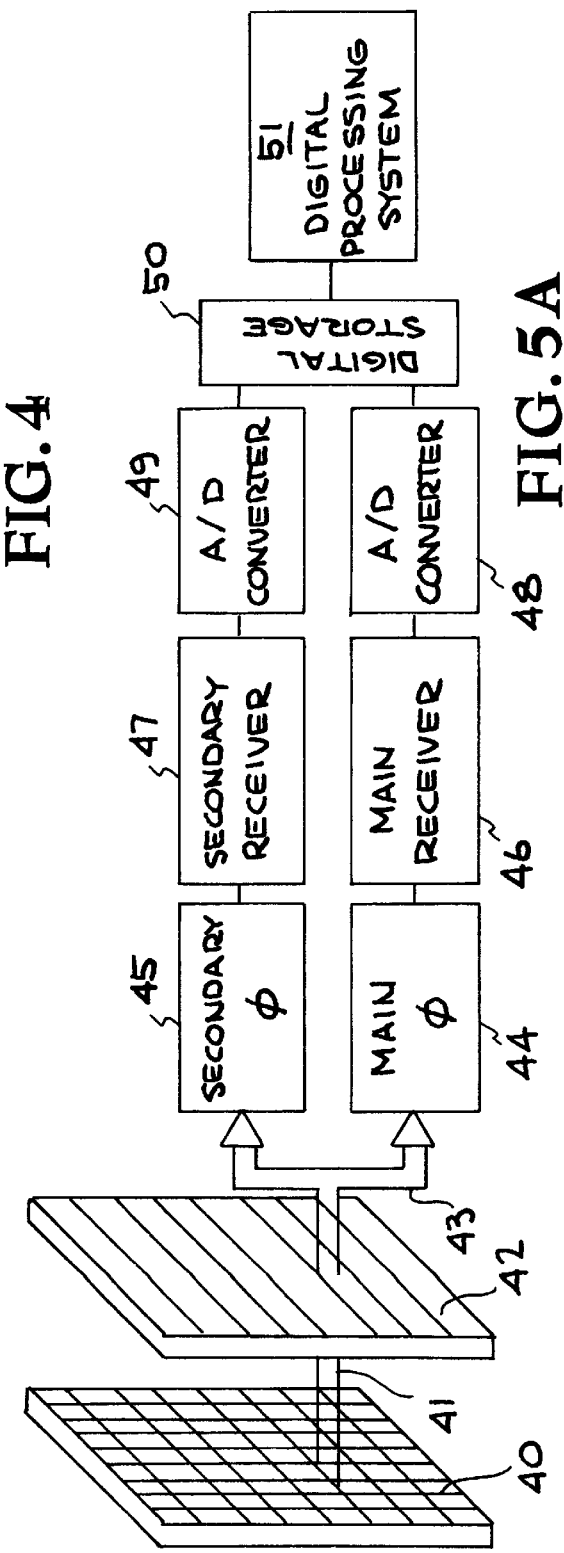
FIGS. 5A, 5B, and 5C illustrate schematically the basic components of the present invention as applied to a corporate-fed phased array with separate phase shift networks, and with signals stored digitally and subtracted during later digital processing (FIG. 5A), or space-fed phased arrays with multiple feeds (FIG. 5B), and corporate-fed phased arrays using a common delay network with multiple taps (FIG. 5C).
Figure 5B:
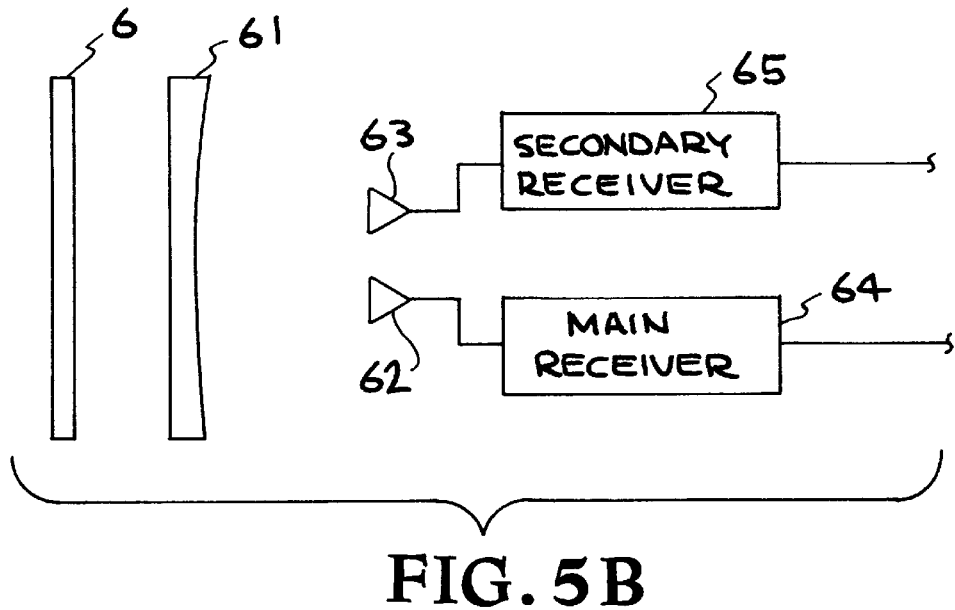
Figure 5C:
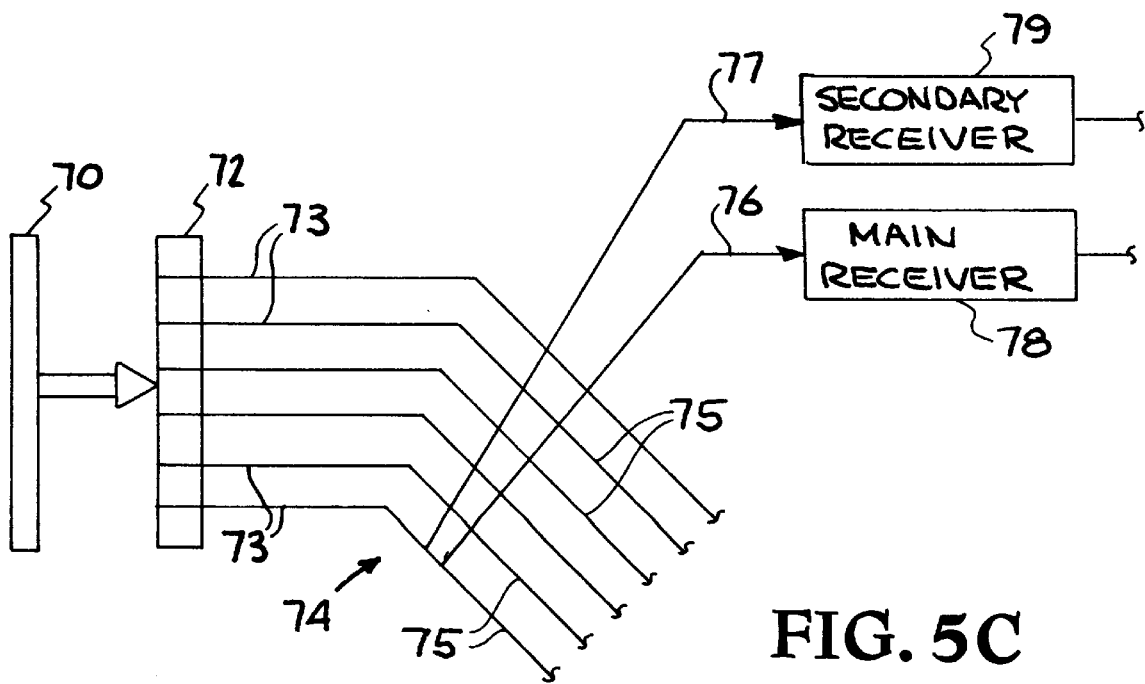

FIGS. 5A–5C schematically illustrate the basic components of a corporate-fed phased array with separate phase shift networks. FIG. 5A illustrates the phased array with signals stored digitally and subtracted during later digital processing. The FIG. 5A embodiment comprises a phased array 40 transmitting m×n signals, indicated at 41, to an azimuth beam-forming network 42, having an n signal output, indicated at 43 which is directed into a pair of elevation beam-forming networks 44 and 45, the outputs of which are directed into a main receiver 46 and a secondary receiver 47. The outputs from receivers 46 and 47 are directed through A/D converters 48 and 49 to a digital storage 50 for processing by a digital processing system 51.

In FIG. 5B the system involves spaced-fed phased arrays with multiple feeds, and includes a phased array 60, a spaced-fed lens assembly 61, a primary feed 62, a secondary feed 63, a main or primary receiver 64 and a secondary receiver 65. The signals picked up by feeds 62 and 63 are directed through receivers 64 and 65, and the outputs thereof may be processed as described above relative to FIG. 5A.

In FIG. 5C the system utilizes corporate-fed phased arrays using a common delay network with multiple taps, and includes a phased array 70 directing signals 71 to an azimuth beam-forming network 72, with signals therefrom indicated at 73 directed into an elevation beam-forming network generally indicated at 74 with tapped delay lines 75. Each of tapped delay lines 75 are connected as indicated at 76 and 77 to a main receiver 78, and a secondary receiver 79 the outputs of which may be processed as in FIG. 5A.

Figure 6:
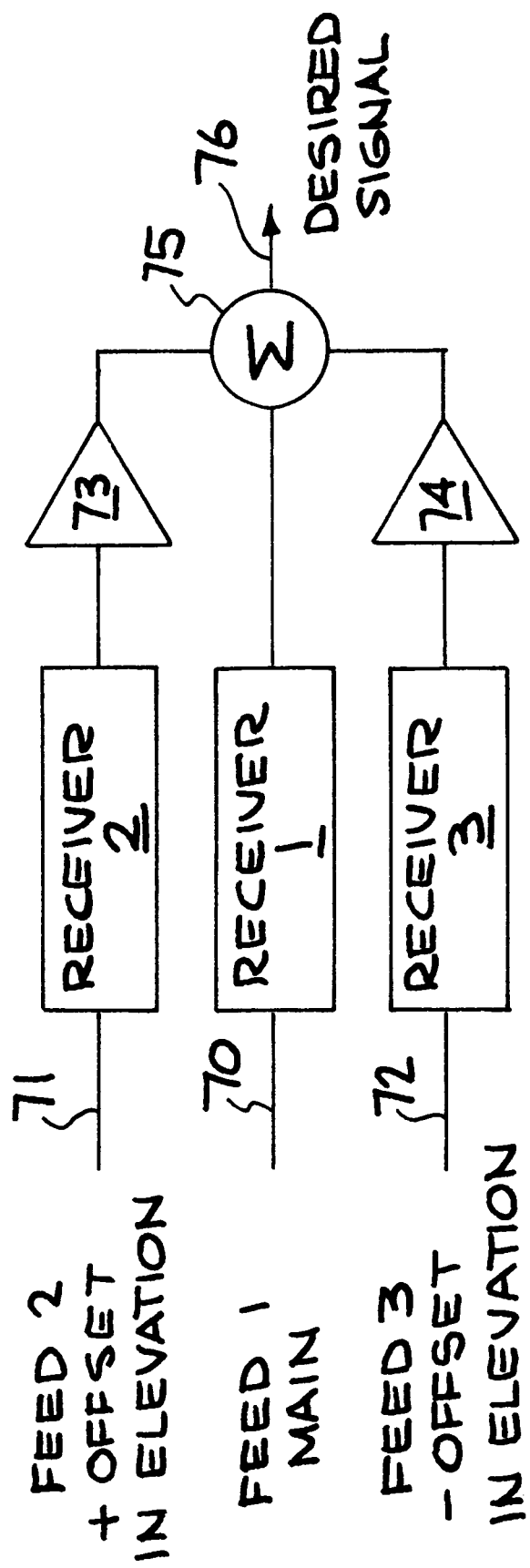
FIG. 6 illustrates schematically the interconnection of three receivers to provide cancellation of ambiguous signals from both pulses N+1 and N−1.

FIG. 6 schematically illustrates the connection of multiple receivers (3 shown) to provide cancellation of ambiguous signals from both pulses N+1 and N−1. As shown, the system includes a feed 1 (main), indicated at 70, a feed 2 (+offset in elevation), indicated at 71, and a feed 3 (−offset in elevation), indicated at 72, which are connected to receiver 1, receiver 2, and receiver 3, respectively. The outputs of receivers 2 and 3 are directed via converters 73 and 74 to a summation device 75, with the output of receiver 1 being connected to device 75, whereby a desired signal 76 is produced, as described above.

Figure 7:
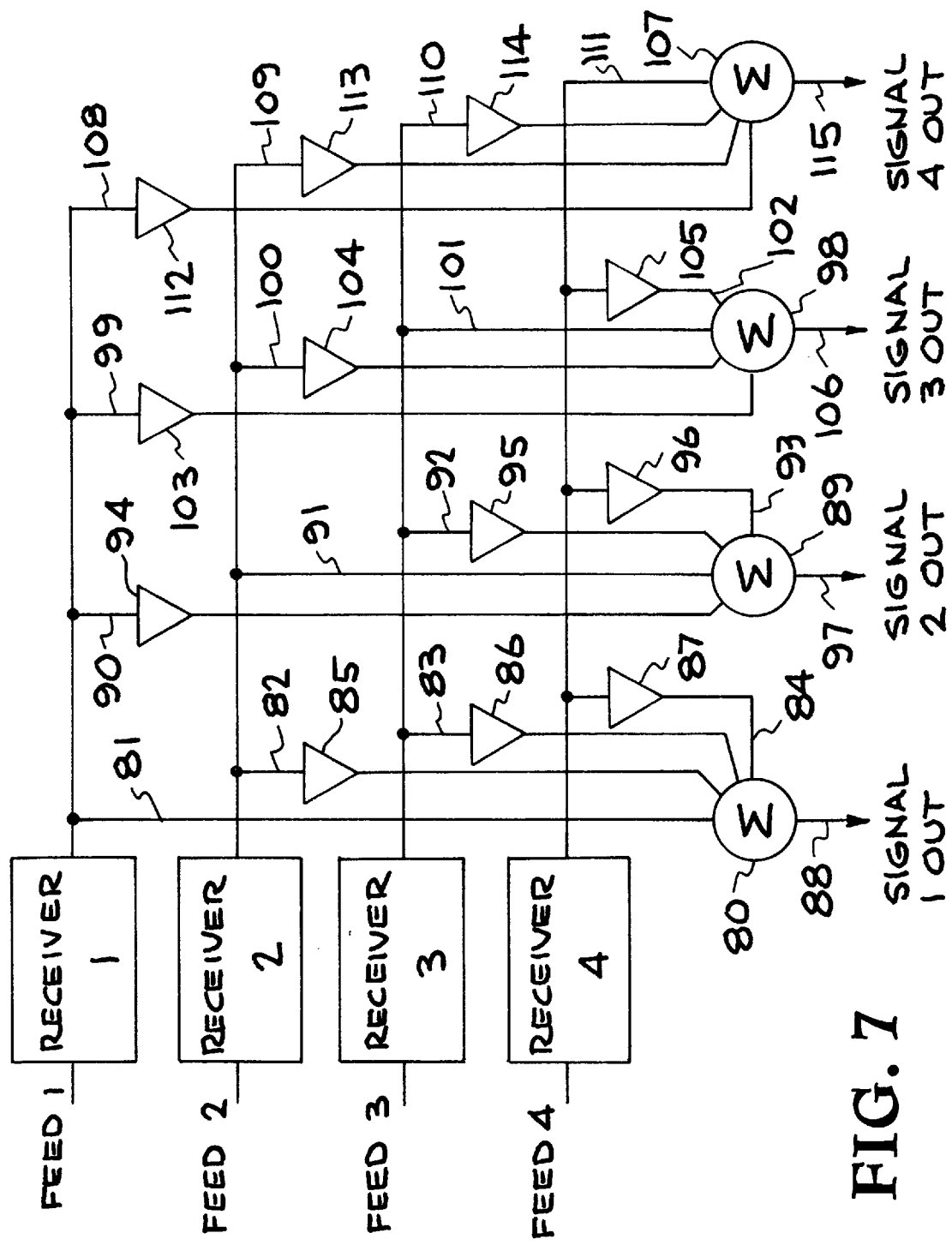
FIG. 7 illustrates schematically the interconnection of four or more receivers in a multiple-beam SAR to provide multiple main outputs as well as suppression of ambiguous signals.

FIG. 7, illustrates schematically the interconnection of multiple (4 or more) receivers in a multiple-beam SAR to provide multiple main outputs as well as suppression of ambiguous signals. As shown, the system comprises feeds 1, 2, 3, and 4 connected to receiver 1, receiver 2, receiver 3, and receiver 4, respectively. The outputs of receivers 1–4 are connected to a summation device 80 via leads 81, 82, 83 and 84, with leads 82–84 each including amplifiers 85, 86, and 87. Device 80 produces a signal 88 (signal 1 out). The outputs of receivers 1–4 are also connected to a second summation device 89 via leads 90, 91, 92, and 93 with leads 90, 92, and 93 including an amplifier 94, 95, and 96, to produce a signal 97 (signal 2 out). Similarly outputs of receivers 1–4 are connected to a third summation device 98 via leads 99, 100, 101, and 102, with leads 99, 100, and 102 including amplifiers 103, 104, and 105, to produce a signal 106 (signal 3 out). Also, outputs of receivers 1–4 are connected to a fourth summation device 107 via leads 108, 109, 110, and 11, with leads 108, 109, and 110 including an amplifier 112, 113, and 114, to produce a signal 115 (signal 4 out).

Thus, the present invention provides a method and apparatus for reducing range ambiguity in Synthetic Aperture Radar systems, such as the above-referenced LLNL TICAS/SAR, by the use of a main receiver and one or more secondary receivers connected to a common antenna with feeds to the receivers being offset in elevation, whereby the secondary receiver output(s) is (are) subtracted from the main receiver output, in such a way as to cancel ambiguous signal without significantly affecting the desired signal.

While particular embodiments of the apparatus and particular operational sequences of the method, along with parameters, etc. have been described and/or illustrated, such are not intended to be limiting. Modifications and changes may become apparent to those skilled in the art, and it is intended that the invention be limited only by the scope of the appended claims.

The invention claimed is:

1. A method for reducing range ambiguity in a synthetic aperture radar system, including:

providing an antenna;

providing the antenna with a main receiver and at least one secondary receiver;

connecting the antenna and receivers with feed systems offset in elevation; and suppressing via the at least one secondary receiver a very specific undesired signal, immediately preceding and following a desired signal received via the main receiver.

2. The method of claim 1, additionally including at least subtracting the output from the at least one secondary receiver from the output of the main receiver so as to cancel ambiguous signals without significantly affecting the desired signal.

3. The method of claim 1, wherein providing the main and at least one secondary receivers is carried out by using a reflector antenna with multiple feed horns.

4. The method of claim 1, wherein providing the main and at least one secondary receivers is carried out using a phased array with multiple phase shift networks.

5. The method of claim 1, wherein providing the main and at least one secondary receivers is carried out using a space-fed phased array with multiple feed elements.

6. The method of claim 1, wherein providing the main and at least one secondary receivers is carried out using a phased array with a single corporate feed network having multiple output taps corresponding to multiple beam positions in elevation.

7. The method of claim 1, wherein the main receiver and the at least one secondary receiver are identical.

8. The method of claim 2, wherein the main receiver and the at least one secondary receiver both receive the desired and range-ambiguous signals via the feed systems.

9. The method of claim 1, additionally including providing at least two identical secondary receivers and connecting said feed system to each of the receivers.

10. The method of claim 1, wherein the feed system connected to said receivers is additionally formed as a parallel feed system so that all phase and timing relationships are identical for all receiver channels.

11. The method of claim 1, additionally including scaling and subtracting the secondary channel signal of the secondary receiver from the main channel signal of the main receiver, whereby the range-ambiguous signal components is canceled out leaving only the desired signal.

12. The method of claim 11, in which at least one scaling coefficient is selected from the group consisting of a function of time, and a function of both time and frequency.

13. The method of claim 11, in which at least one scaling coefficient is determined from the group consisting of calculation based on known properties of the antenna system and the geometry of the radar system and target, from measurement of one or more unambiguous pulses, and from analysis of collected radar data.

14. The method of claim 11, wherein the function of the main and secondary channels are reversed so that the signal from the main channel is canceled out and the range ambiguous signal remains.

15. In a method for reducing range ambiguous signal in a synthetic aperture radar system, the improvement comprising:

utilizing secondary receiver channels to detect ambiguous signals and by scaling and subtracting same from the signal received by a main receiver channel, and suppressing via the secondary receiver channels an undesired signal immediately preceding and following a desired signal received via the main receiver channel.

16. The improvement of claim 15, additionally including connecting the main receiver and secondary receiver to a common antenna with parallel feed systems offset in elevation so that all phase and timing relationships are identical for all channels, and so that the ambiguous signals from greater or lesser range are detected with maximum gain while the main signal is attenuated in these channels.

17. The improvement of claim 15, wherein the scaling and subtraction is carried out in real time such as by directly combining the receiver outputs in analog or digital form.

18. The improvement of claim 15, wherein the scaling and subtraction is carried out by recording the ambiguous signal and the main signal and performing the scaling and subtraction during digital image processing.

19. The improvement of claim 17, wherein a scaling coefficient is made frequency dependent by separating the received signal into multiple frequency bands via a plurality of filters, and applying a separate scaling coefficient to each frequency band.

20. A method of reducing range-ambiguous signal components in each receive channel in a synthetic aperture radar system having multiple receive beams and corresponding multiple receiver channels, comprising:

scaling and subtracting the signals produced by other receive channels, whereby an undesired signal is suppressed via certain of the receiver channels immediately preceding and following a desired signal.

* * * * *